June 1, 1943.    R. A. DOUGHTY    2,320,543
WIRE ROPE CLAMP AND SOCKET
Filed Oct. 31, 1941
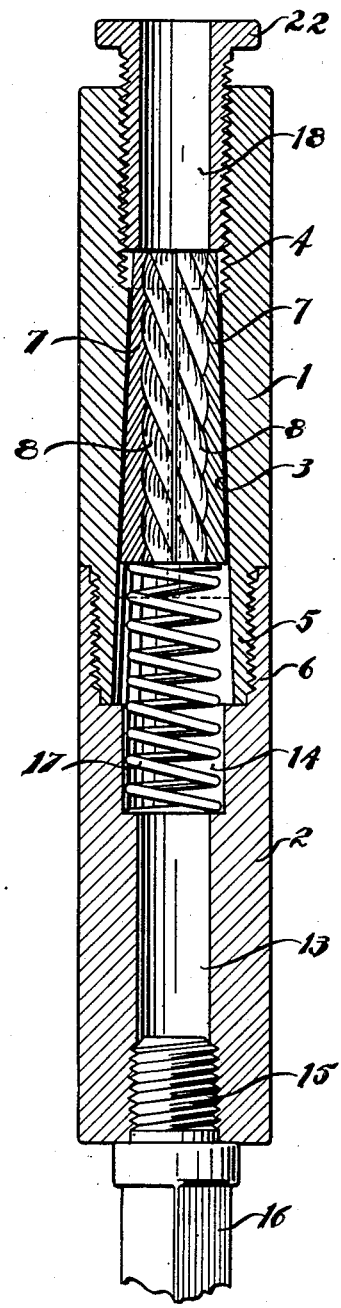
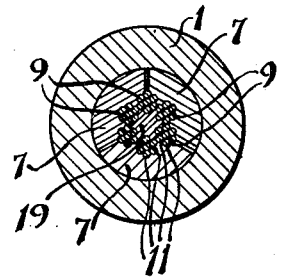
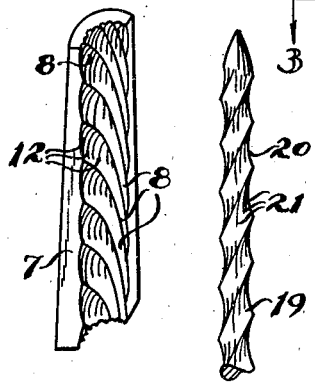
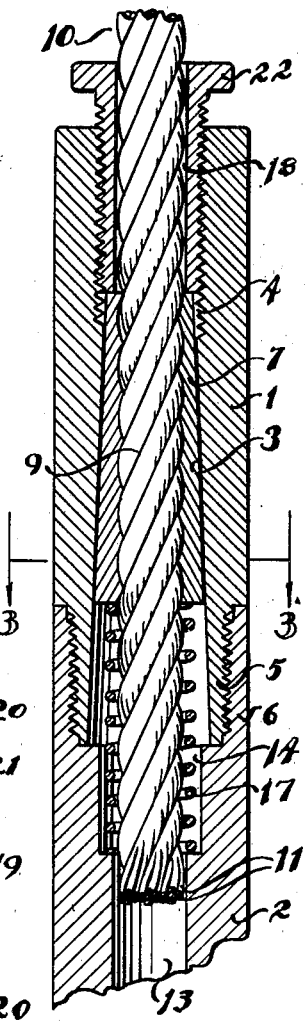
REGINALD A. DOUGHTY
INVENTOR
BY
ATTORNEY Patented June 1, 1943

2,320,543

UNITED STATES PATENT OFFICE 2,320,543

WIRE ROPE CLAMP AND SOCKET

Reginald A. Doughty, Abilene, Tex.

Application October 31, 1941, Serial No. 417,223

4 Claims. (Cl. 287—78)

This invention relates to sockets and clamps for wire ropes or cables used in drilling operations and it has particular reference to a wire rope clamp adapted to be installed at the end of a cable for the attachment of a tool, or the like, and its principal object resides in the provision of a dependable and safe arrangement whereby heavy tools may be suspended upon the end of the cable with a minimum of effort in its installation.

Another object of the invention resides in the provision of a wire rope clamp embodying means for retaining the cable gripping slip in place until the weight of the tool or the cable fully adapts the said slip to their proper positions upon the strands of the cable, to prevent slippage, and thereby make for greater safety in the operation of the device, as well as to afford a means for retaining the slips within the main body of the clamp at all times, whether in use or not.

Yet another object of the invention is manifest in the provision of a means arranged in the uppermost end of the clamp, which is preferably in two sections, for exerting a downward pressure against the upper ends of the slip to disengage the same from the walls of the conical chamber into which they are drawn by the cable whereby the operation attendant upon removing the clamp from the cable can be greatly minimized and much of the hazard connected therewith eliminated.

An object of the invention is that of providing a plurality of tapered slips having their inner faces spirally grooved to receive the spirally arranged strands of the cable, and to provide such spiral grooves with the smaller individual spiral grooves, for each of the larger grooves, adapted to be engaged by the smaller strands of each spiral strand of the cable thus forming a combination of grooves and recesses whereby a positive grip can be applied to the cable insuring the same against being rotated or "threaded" out of the slip when weight is applied thereto.

Still another object of the invention resides in the provision of a core pin spirally grooved and having each of the spiral grooves formed with small individual spirally arranged grooves adapted to receive the individual spirally arranged strands of each major strand of the cable and thus insure a greater grip to prevent the cable from being crushed within the slip, and replace the conventional hemp core usually employed in the construction of cables of the type here under consideration.

It is also an object of the invention to provide a means whereby some tool, such as a sucker rod or grappling tool, or the like, may be applied to the end of the clamp thus adding to its utilitarian scope.

Broadly, the invention seeks to comprehend the provision of a cable clamp and socket, especially designed for wire drilling cables, embodying, in combination with the slip for gripping the cable, means for retaining the slips in engagement with the said cable while the cable is not under stress, and means for urging the said slips out of the socket and thus minimizing the effort which would be otherwise necessary in the detachment of the clamp from its cable.

While the foregoing objects are paramount, other and lesser objects will become manifest as the description proceeds, taken in connection with the appended drawing wherein:

Figure 1 is a vertical cross sectional illustration of the invention showing the threaded engagement of the upper and lower sections, the longitudinal conical bore in the upper section and the straight bore, having an enlarged recess at its upper end, in the lower section, illustrating the slips and means urging the same upwardly into the conical bore and means for disengaging the same therefrom.

Figure 2 is a fragmentary vertical cross sectional illustration of the invention showing a cable applied thereto and illustrating the several strands thereof.

Figure 3 is a lateral cross sectional view taken on lines 3—3 of Figure 2.

Figure 4 is a perspective illustration of one of the slips showing the spiral arrangement of grooves adapted to receive the main spiral strands of the cable and also showing the smaller spiral arrangement of grooves adapted to receive the spiral individual strands of each major strand of the cable, and Figure 5 illustrates a core pin formed with a spiral groove to accommodate the major strands of the cable and also illustrating the small spiral arrangement of grooves within the larger spiral grooves to receive the individual strands of the major strands of the said cable.

The invention consists primarily of a body comprised of two sections which will be hereinafter referred to as the upper section 1 and the lower section 2, as illustrated particularly in Figure 1. The upper section is formed with a central longitudinal conical bore 3, the upper end of which terminates within a threaded bore 4 while the lower end extends through an exteriorly threaded portion 5 received by the interiorly threaded socket 6 integral with the upper end of the member 2, as illustrated in Figure 1.

A plurality of tapered slips 7 are arranged within the conical bore 3 in the member 1, the outer surfaces being smooth and tapered to conform to the inclined conical wall of the bore 3 while their inner surfaces are adapted to vertical alinement but having an arrangement of spirally arranged grooves 8 conformable to the spiral strands 9 of the cable 10, illustrated in Figure 2. One of the slips 7 is illustrated in perspective in Figure 4.

The conventional cable 8 is constructed with a plurality of twisted strands 9 each being composed of a number of individual small strands 11, as illustrated in Figures 2 and 3, and the slips 7 are formed with small spirally arranged grooves 12 adapted to receive these smaller strands 11 of each of the larger strands 9 of the cables 10. This arrangement provides for a positive grip upon the cable 10 and will prevent the same from "crawling" or from being twisted out of the socket under stress and will certainly provide a greater grip than such as may be afforded by providing smooth grooves 8 instead of equipping the same with the tiny grooves 12 for gripping the individual strands 11 of the cable 10. It is preferable that the slips 7 be of such dimension that these members will not be joined under the greatest stress so as to insure a positive grip upon the cable 10. This arrangement is illustrated in Figure 3.

The lower section 2 of the invention is provided with a longitudinal bore 13 having an enlarged recess 14 formed at its upper end. The bore 13 is interiorly threaded at the lower end of the section 2, as illustrated in Figure 1, to receive the threaded pin 15 of the sucker rod 16, or the like, which may be employed in certain operations in the well. It is obvious that any instrument, such as a fishing tool, or the like, may also be attached to the lower end of the body section 2 of the invention.

A spring 17 is arranged so that its lower end is supported within the recess 14 in the member 2 and extends upwardly into the lower end of the conical bore 3 of the member 1 and bears against the lower ends of the slips 7 retaining the same in their contracted position in the conical bore 3, as illustrated in Figure 1.

A threaded sleeve 18 is adapted to operate against the upper ends of the slips 7 to disengage the same from the walls of the conical bore 3 when stress has been applied to the cable 10 and the slips 7 have been drawn tightly up into the socket or conical bore 3 of the body member 1. Normally the threaded sleeve 18 is threaded upwardly until the lower end of this member is spaced above the upper limit of the upward movement of the slips 7 so that the latter may be free to be urged up into the conical bore and tightly engage the cable 10 with a firm grip. It is apparent that no stress will necessarily be applied to the member 18 since this member is employed only for the purpose of disengaging or loosening the slips 7 from their position brought about through stress on the cable 10 in the bore 3. While the member 18 is shown as a single sleeve, it is obvious that this element can be made in two pieces so that it can be installed or removed without slipping the same over the end of the cable 10.

It will be noted, by reference to Figure 2, that the end of the cable 10 extends downwardly through the spring 17 and into the bore 13 of the lower section 2 of the body. The assembly is applied to the cable 10 by unthreading the lower body section 2 from the upper body section 1 and removing the slips 7 from the bore 3 and inserting the ends of the cable 10 through the threaded sleeve 18 and the conical bore 3 in the member 1, replacing the slips 7 in the bore 3 around the cable 10 and pulling the latter upwardly into the socket or bore 3 in the member 1. The spring 17 is placed in the recess 15 in the member 2 threaded upon the member 1 so that the tension of the spring 17 will urge the slips 7 upwardly against the tapered walls of the bore 3 and against the cable 10.

The strands 9 of the conventional cable 10 are ordinarily wound about a hemp core (not shown), such as felt, and will permit the strands 9 to contract under stress and may permit the cable to slip through the slips 7 since a great stress upon the cable 10 will serve to crush the hemp core. A metal core pin 19 is therefore preferably provided which is formed with a spiral groove 20 having a multiplicity of small spiral grooves 21 therein, each adapted to receive the individual strands 11 of the major strands 9 of the cable 10 and function in the same manner as do the small grooves 12 of the larger spiral grooves 8 of the slips 7. The purpose of this arrangement is to afford a positive grip upon the cable 10 and prevent slippage of any degree taking place under stress.

The care pin 19 may be of any length but preferably of such length as to extend from the lowermost end of the cable 10 upwardly through the slips 7 and is preferably formed of some relatively hard metal, such as steel, or the like, and provides an unyielding surface interiorly of the cable 10 to which pressure may be applied and to prevent the cable from being crushed or cut in two at the point where the slips 7 embrace the same. The slip assembly and the member 20 are illustrated in lateral cross section in Figure 3 showing the adaptation of the grooves 12 and 21 of the slips 7 and the pin 19 with the several individual strands 11 of the cable 10 which insures a positive contact with and envelopment of each individual strand of the cable 10 by the spiral grooves 8 and 20 of the members 7 and 19 to prevent the cable 10 from being twisted or rotated out of the slips 7.

The core pin 19 may be of any metal considered desirable for the specific conditions and under some circumstances a soft metal, such as lead or babbit may be desirable. The inner surfaces of the slips 7 may also be coated with a soft metal when a hemp rope is used with the device to avoid crushing the same.

As previously pointed out, the sleeve 18 can be threaded downwardly in the upper end of the member 1 against the upper ends of the slips 7 to cause the disengagement of these members from the inner walls of the conical bore 3 and permit the assembly of slips to be withdrawn from the latter and removed from the cable 10. In operation, however, the sleeve 18 is threaded upwardly so that the same will clear the upper ends of the slips 7 and permit the latter to extend upwardly their full limit. It is ordinarily difficult to remove the slips from the conical member 3 without the use of some instrument, such as the member 18, to aid in such operation. The sleeve 18 is provided with a polygonal head 22 which may be engaged by a wrench, or other tool, for its rotation.

While the particular embodiment of the invention is described in great detail, it is not intended that the same be so limited that certain modifications might not be resorted to which may be considered as falling within the spirit of the invention and within the scope of the appended claims.

What is claimed is:

1. In a cable socket and clamp, the combination of a sectional body adapted to be threadedly connected at its midsection, a longitudinal conical bore in the upper section, a set of slips, each having their inner faces spirally grooved to receive the individual spiral strands of a cable, operatively arranged in the said bore, a spring extending into the said bore engaging the lower ends of the said slips normally urging the same into the said bore and means in the upper end of the said body adapted to engage the upper ends of the said slips to dislodge the same from the said bore.

2. In a cable socket and clamp, the combination of a body comprised of upper and lower sections adapted to be threadly connected, a tapered bore in the upper section, a plurality of tapered slips, having their inner faces spirally grooved to engage the spiral strands of a cable, operatively arranged in the said bore, a recess formed in the said lower section near the upper end thereof, a spring arranged in the said recess and extending into the said bore normally engaging the lower ends of the said slips and means in the top of the said upper section adapted to be operated against the upper ends of the said slips urging the same downwardly in the said bore.

3. The combination with a drilling cable, a cable clamp and socket comprising a threadedly connected body having upper and lower sections, a longitudinal conical bore in the upper section and a straight longitudinal bore having an enlarged recess at its upper end in the lower section, a plurality of tapered slips having spirally grooved inner faces adapted to receive the spiral strands of the said cable operatively arranged in the said conical bore, a spring disposed in the said recess and extending into the said conical bore engaging the lower ends of the said slips and exerting a tension thereon and means in the upper end of the said body adapted to disengage the said slips from the said cable and the said conical bore.

4. The combination with a drilling cable, a cable clamp and socket comprising a body having threadedly connected upper and lower sections, a longitudinal conical bore in the upper section and a cylindrical bore having an enlarged recess at its upper end longitudinally arranged in the lower section, a plurality of slips having spirally grooved inner faces adapted to engage the spiral strands of the said cable operatively disposed in the said conical bore, a spring arranged in the said recess and extending upwardly into the said conical bore engaging the lower ends of the said slips urging the same upwardly into the said conical bore and threaded means engageable with the upper ends of the said slips for urging the same downwardly in the said conical bore.

REGINALD A. DOUGHTY.